(12) United States Patent
Boillat et al.

(10) Patent No.: US 11,709,081 B2
(45) Date of Patent: Jul. 25, 2023

(54) FLUID FLOW RATE MEASUREMENT DEVICE

(71) Applicant: Seyonic S.A., Neuchâtel (CH)

(72) Inventors: Marc Boillat, Auvernier (CH); Bart Van Der Schoot, Neuchâtel (CH); Yari Luchessa, Cortaillod (CH)

(73) Assignee: SEYONIC S.A., Neuchâtel (CH)

( * ) Notice: Subject to any disclaimer, the term of this patent is extended or adjusted under 35 U.S.C. 154(b) by 152 days.

(21) Appl. No.: 17/182,907

(22) Filed: Feb. 23, 2021

(65) Prior Publication Data

US 2021/0262840 A1 Aug. 26, 2021

(30) Foreign Application Priority Data

Feb. 24, 2020 (EP) .................................... 20159069

(51) Int. Cl.
| | |
|---|---|
| *G01F 1/40* | (2006.01) |
| *G01F 1/36* | (2006.01) |
| *G01F 1/38* | (2006.01) |
| *G01F 1/37* | (2006.01) |

(52) U.S. Cl.
CPC .................. *G01F 1/40* (2013.01); *G01F 1/36* (2013.01); *G01F 1/38* (2013.01); *G01F 1/372* (2013.01)

(58) Field of Classification Search
CPC .................. G01F 1/36; G01F 1/38; G01F 1/40
See application file for complete search history.

(56) References Cited

U.S. PATENT DOCUMENTS

| | | | |
|---|---|---|---|
| 3,596,680 | A | 8/1971 | Adams |
| 6,898,981 | B1 | 5/2005 | Boillat et al. |
| 6,953,162 | B2 | 10/2005 | Hans |
| 8,474,322 | B1 | 7/2013 | Shapiro |
| 10,151,612 | B2 | 12/2018 | Hunziker et al. |

(Continued)

FOREIGN PATENT DOCUMENTS

| | | |
|---|---|---|
| DE | 4216086 | 11/1993 |
| DE | 101 08 195 | 8/2002 |

(Continued)

OTHER PUBLICATIONS

European Search Report for EP 20 15 9069 dated Aug. 10, 2020, 4 pages.

(Continued)

*Primary Examiner* — Erika J. Villaluna
(74) *Attorney, Agent, or Firm* — Nixon & Vanderhye

(57) ABSTRACT

A fluid flow rate measurement device includes: a manifold element including a first fluid conduit extending from a surface thereof and terminating in a first port opening at a first lateral surface thereof and a second port opening at a second lateral surface thereof, and a second fluid conduit extending from a surface thereof and terminating in a third port opening at the first lateral surface and a fourth port opening at the second lateral surface; a fluid restriction element fixed to the first lateral surface and arranged to provide a sealed fluid pathway between the first port and the third port; and—a pressure sensor assembly fixed to the second lateral surface and including a first pressure sensor in fluidic communication with the second port, and a second pressure sensor in fluidic communication with the fourth port.

20 Claims, 2 Drawing Sheets

(56) References Cited

U.S. PATENT DOCUMENTS

| | | |
|---|---|---|
| 10,655,989 B2 * | 5/2020 | Doering .............. G01L 19/0023 |
| 2004/0025585 A1 | 2/2004 | Seki et al. |
| 2007/0151366 A1 | 7/2007 | McDonald et al. |
| 2007/0277623 A1 | 12/2007 | McDonald et al. |
| 2008/0047339 A1 | 2/2008 | Hasebe |
| 2008/0264181 A1 | 10/2008 | Sulouff et al. |
| 2009/0078040 A1 | 3/2009 | Ike et al. |
| 2010/0064816 A1 | 3/2010 | Filippi et al. |
| 2010/0154532 A1 | 6/2010 | Becke et al. |
| 2012/0161256 A1 | 6/2012 | Grudin et al. |
| 2013/0319105 A1 | 12/2013 | Tanaka et al. |
| 2014/0044568 A1 | 2/2014 | Fouillet et al. |
| 2015/0090039 A1 | 4/2015 | Broden et al. |
| 2016/0290849 A1 | 10/2016 | Badarlis et al. |
| 2021/0231473 A1 * | 7/2021 | Yuuki ....................... G01F 1/46 |

FOREIGN PATENT DOCUMENTS

| | | |
|---|---|---|
| DE | 10 2014 108 349 | 12/2015 |
| DE | 10 2014 108 351 | 12/2015 |
| DE | 10 2015 110 711 | 1/2017 |
| EP | 1 364 118 | 2/2008 |
| EP | 1 364 188 | 11/2009 |
| EP | 3 457 093 | 3/2019 |
| GR | 1008114 | 2/2014 |
| WO | 95/08065 | 3/1995 |
| WO | 2015/189028 | 12/2015 |
| WO | 2015/189029 | 12/2015 |

OTHER PUBLICATIONS

Boillat et al., "High Precision Piezo-Resistive Sensing Techniques for Micro-Dosing Applications," Proceedings, Sensor Expo, Cleveland, 1999, 3 pages.

Boillat et al., "A Differential Pressure Liquid Flow Sensor for Flow Regulation and Dosing Systems," IEEE, 1995, 0-7803-2503-6, pp. 350-352.

* cited by examiner

FLUID FLOW RATE MEASUREMENT DEVICE

CROSS-REFERENCE TO RELATED APPLICATIONS

This application claims priority to EP 20159069.2 filed Feb. 24, 2020, the entire contents of which is hereby incorporated by reference.

BACKGROUND OF THE INVENTION

Field of the Invention

The present invention relates to the field of fluidic measurement devices. More particularly, it relates to a fluid flow rate measurement device that can be used for pipetting, fluid dosing or similar applications.

Description of the Related Art

Document EP1364188 describes a fluid flow rate measurement device for e.g. pipetting, dosing or similar applications. This meter is constructed of two micromachined plates which fixed to each other and define a fluid pathway leading from a first port to a second port. This fluid pathway comprises a first chamber adjacent to the first port and a second chamber adjacent to the second port, these chambers being linked by means of a fluid restriction of serpentine form. Each of the chambers has a flexible outer wall provided with piezoresistive strain gauges, these gauges being electrically connectable in a Wheatstone bridge configuration so as to form a pressure sensor.

When a fluid such as air, or a liquid (e.g. water, an oil or similar), flows through the fluid pathway, the fluid restriction causes a different pressure in the downstream chamber compared to the upstream chamber. The wall of the upstream chamber hence flexes to a different extent than that of the downstream chamber. This difference in strain is measured by subtracting the pressure sensor outputs and can be used to calculate the flow rate. By integrating the flow rate with respect to time, the volume of fluid which has flowed can also be calculated. Furthermore, in order to increase the measurement precision, a thermoresistor acting as a temperature sensor is provided, whose output is used to determine the viscosity of the known fluid in the fluid pathway.

While this arrangement is extremely compact and simple to manufacture, a dedicated flow sensor is required for different fluid viscosities and/or flow rate ranges in order to optimise the precision and accuracy of its output. This requires a re-design of the entire sensor for each set of parameters, particularly in respect of the dimensioning of the fluid restriction and the thickness of the walls of the chambers in order to provide the optimum sensitivity and linearity of response.

An object of the present invention is hence to at least partially overcome the drawbacks of the prior art.

SUMMARY OF THE INVENTION

This object is attained by a fluid flow rate measurement device as defined in claim 1. More particularly, this fluid flow rate measurement device comprises:
- a manifold element comprising a first fluid conduit extending from a surface thereof and terminating in a first port opening at a first lateral surface of the manifold element and a second port opening at a second lateral surface of the manifold element, and a second fluid conduit extending from a surface of the manifold element (which may be the same as the surface mentioned previously or different) and terminating in a third port opening at said first lateral surface and a fourth port opening at said second lateral surface;
- a fluid restriction element fixed to said first lateral surface and arranged to provide a sealed fluid pathway (i.e. a connecting conduit) between said first port and said third port. Such a fluid restriction is arranged to create a pressure drop in the direction of fluid flow, such that the pressure at the downstream port is lower than at the upstream port;
- a pressure sensor assembly fixed to said second lateral surface and comprising a first pressure sensor in fluidic communication with said second port, and a second pressure sensor in fluidic communication with said fourth port. The pressure sensors can be of any convenient type, such as those based on piezoresistive strain gauges, and are electrically connectable in any convenient manner such as that disclosed in EP1364188 in order to measure flow rate based on the difference in outputs between the two pressure sensors.

This three-part construction is easy to assemble, can be disassembled for cleaning or for replacement of either or both of the fluid restriction element and pressure sensor assembly. Such a replacement is useful either in the case of contaminated components which must be exchanged, or in order to optimise the response of the device. In this latter case, different forms of fluid restriction and/or pressure sensors can be adapted to different fluid viscosities and/or flow rates in order to optimise sensitivity and measurement precision.

Advantageously, said first surface is situated on an opposite face of said manifold element with respect to said second surface, said first and second surfaces being substantially parallel with respect to each other. In such a configuration, said first port is substantially coaxial with respect to said second port, and said third port is substantially coaxial with respect to said fourth port. This construction is particularly compact and minimises the length of the ports, however other arrangements are possible, the first and second lateral surfaces being e.g. predetermined zones of one face of the manifold element, or situated on adjoining faces thereof.

Advantageously, said first fluid conduit is substantially coaxial with said second fluid conduit.

Advantageously, sealing elements such as O-ring gaskets are arranged to seal each of said first and third ports with respect to said fluid restriction element, and to seal each of said second and fourth ports with respect to said pressure sensor assembly.

Advantageously, at least one of said fluid restriction element and said pressure sensor assembly are attached to said manifold element by means of a respective cover. For instance, the cover can be clipped on to said manifold element, or alternatively can be screwed, glued, welded or otherwise attached thereon.

Advantageously, said pressure sensor assembly comprises a first cavity in fluidic communication with said second port and a second cavity in fluidic communication with said fourth port. Each of said cavities may be delimited on one side by a flexible wall provided with at least one strain gauge (typically two strain gauges) integrated into or on said wall, although other configurations of pressure sensor are also possible.

Advantageously, said pressure sensor assembly comprises at least one temperature sensor, arranged to measure the temperature of the fluid in the assembly either directly or indirectly. This at least one temperature sensor is furthermore advantageously integrated into the flexible wall delimiting either of the aforementioned cavities, or each flexible wall may comprise such a temperature sensor. Alternatively, the temperature sensor can be attached to or integrated in said pressure sensor assembly, particularly be being attached to or integrated in a support comprised by said pressure sensor assembly. This allows measurement of the fluid temperature and hence accurate determination of its viscosity, which improves fluid flow rate measurement precision in the case in which the viscosity is sufficiently affected by temperature in practice to provide inadequately precise fluid flow measurements.

The above-mentioned features can be combined in any manner which makes technical sense.

BRIEF DESCRIPTION OF THE DRAWINGS

Further details of the invention will become clearer upon reading the following description, in reference to the figures in which.

DETAILED DESCRIPTION OF THE PREFERRED EMBODIMENTS

Figure 1:
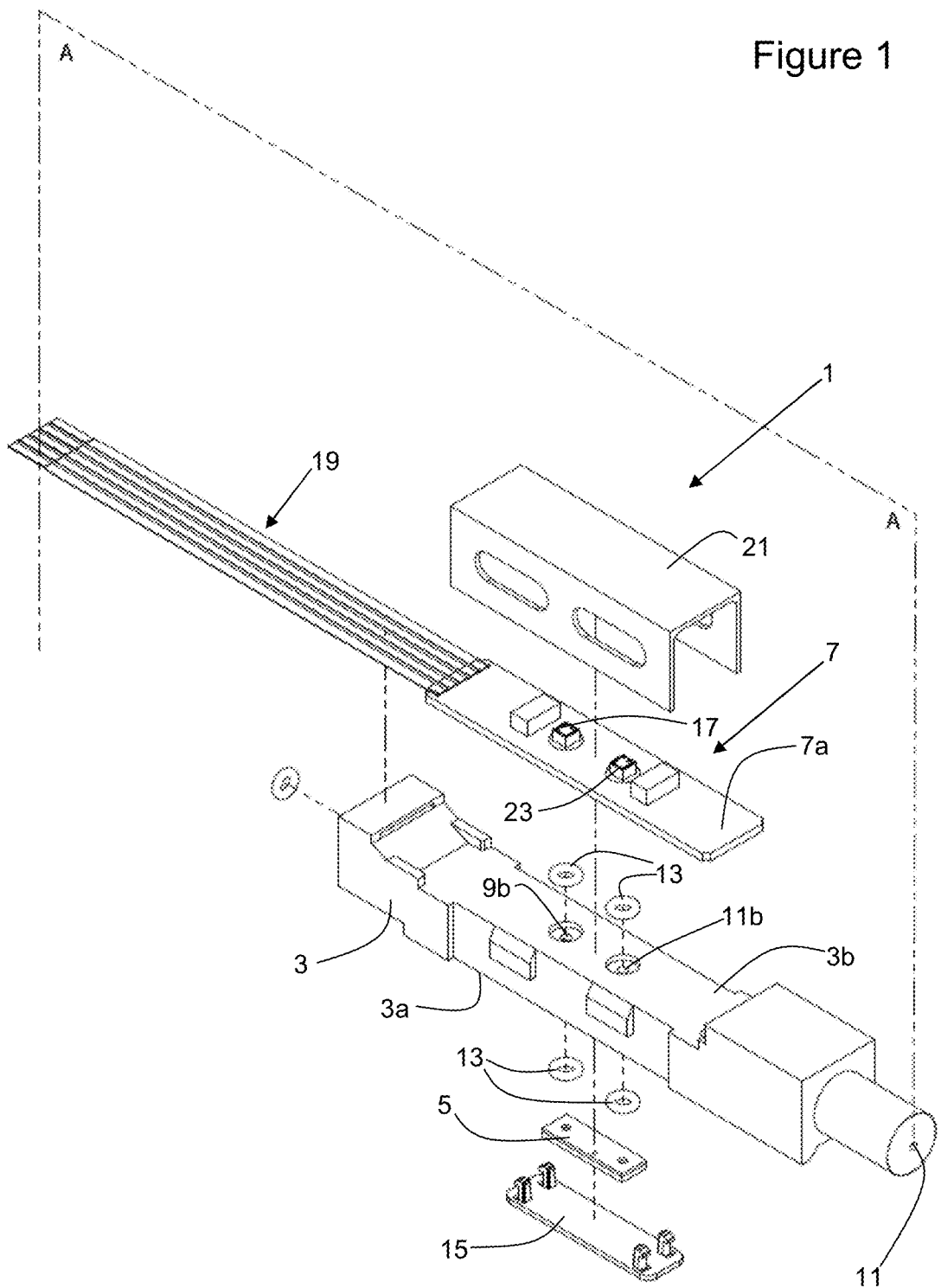
FIG. 1 is an isometric exploded diagram of a fluid flow rate measurement device according to the invention.
Figure 2:
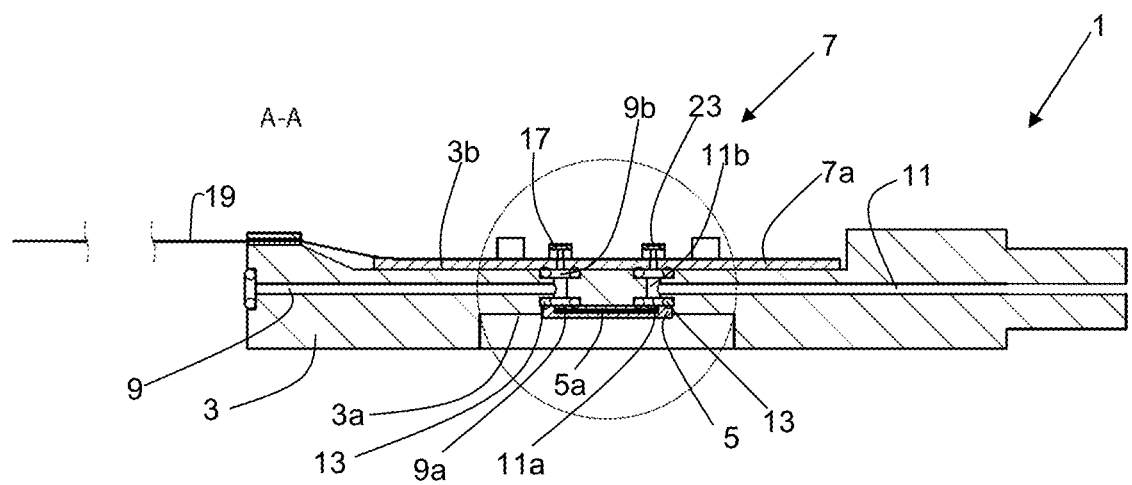
FIG. 2 is a schematic cross-sectional view of a partially assembled device according to the invention, along the line A-A of FIG. 1.
Figure 3:
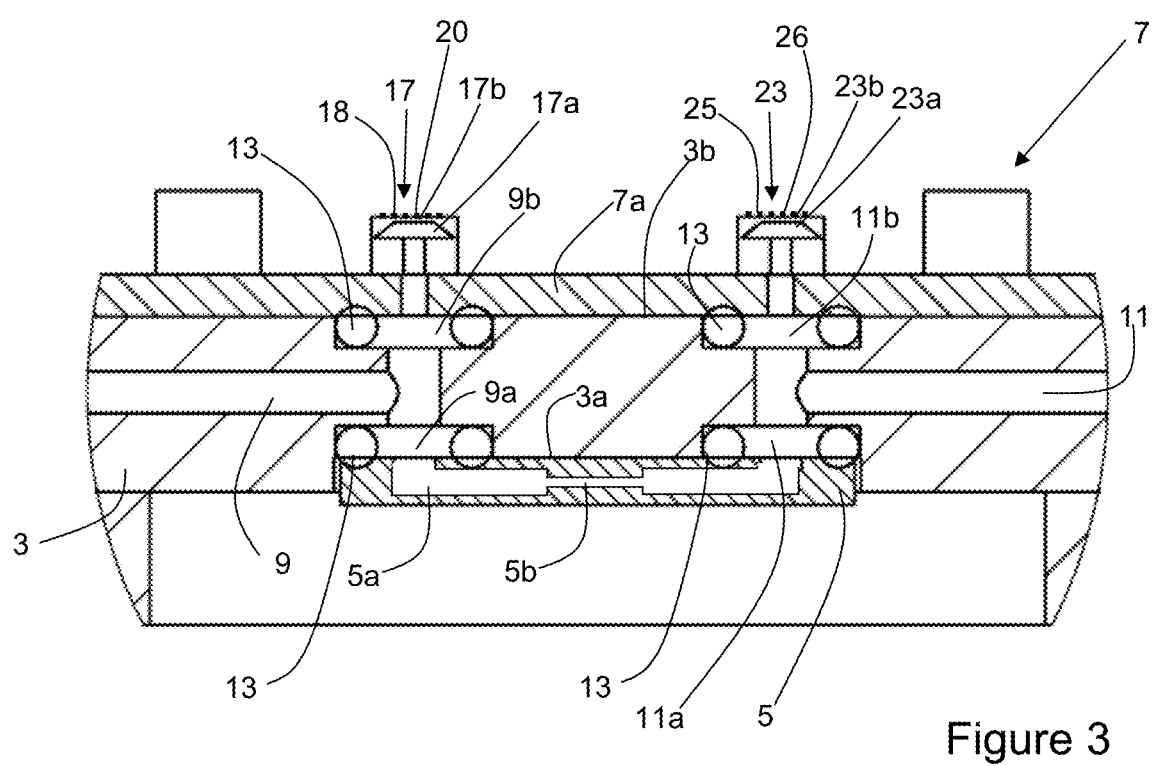
FIG. 3 is a magnified representation of part of FIG. 2 indicated with a circle.

FIGS. 1-3 illustrate schematically a nonlimiting embodiment of a fluid flow rate measurement device 1 according to the invention.

The device 1 comprises three principal components, namely a manifold element 3, a fluid restriction element 5, and a pressure sensor assembly 7, these latter two elements being fixed to opposite faces of the manifold 3.

The manifold element 3 comprises a first fluid conduit 9 extending from an outer surface thereof (an end surface in the illustrated embodiment) to a first port 9a opening at a first lateral surface 3a of the manifold element 3, and to a second port 9b opening at a second lateral surface 3b of the manifold element 3 (which is again an end surface in the illustrated embodiment). In the illustrated construction, the first surface 3a and the second surface 3b are situated on opposite faces of the manifold element 3, but although this is advantageous for reasons of compactness and minimising the length of the ports 9a, 9b, this is not obligatory. For instance, both ports 9a, 9b (and hence the first and second surfaces 3a, 3b) could be situated on the same side of the manifold element 3 and disposed laterally with respect to each other, or on adjoining faces. Indeed, all the ports 9a, 9b, 11a, 11b and the conduit openings can in principle be situated on the same face of the manifold element 3 (in which case each surface is a predetermined zone of said face), although this is not a preferred arrangement.

The manifold element 3 furthermore comprises a second fluid conduit 11, again extending from an outer surface of the manifold element 3 to a third port 11a opening at said first surface 3a and a fourth port 11b opening at said second surface 3b. In the illustrated embodiment, the first and second conduits 9, 11 are coaxial and extend from opposite outer surfaces of the manifold element 3, but they can be arranged in any desired manner as noted above.

The first port 9a and third port 11a are fluidically connected with each other by means of a fluid restriction element 5, which comprises a connecting conduit 5a, 5b and is fixed to said first surface 3a by means of a clipped-on cover 15 (see FIG. 1; omitted on FIGS. 2 and 3). This latter presses the fluid restriction element 5 against the first surface 3a and compresses seals 13 provided so as to prevent leakage of fluid from the interface between each port 9a, 11a and the fluid restriction element 5. As illustrated, these seals are typical O-rings 13 (illustrated schematically on FIGS. 2 and 3 by circles), which are held in compression between the fluid restriction element 5 and the manifold element 3 by means of the clipped-in cover 15. Alternatively, silicone sealant, glue, or welding can be used to ensure that fluid does not leak out from the interface between the manifold element 3 and the fluid restriction element 5. Alternatively, the fluid restriction element 5 can be retained by suitable clips, rivets, screws, glue, welding or similar, either acting directly on the fluid restriction element 5 or on a cover 15. The fluid restriction 5b of the connecting conduit 5a, 5b is of smaller cross-sectional area than each of the first and second fluid conduits 9, 11, in order to create a suitable pressure drop when fluid flows from the first to second conduits 9, 11 or vice-versa.

The restriction 5b may be an orifice, a serpentine (as in document EP1364188 mentioned above), a simple tube or similar, of suitable length and cross-sectional area. The form and dimensions of the restriction 5b can be adapted according to the viscosity and flow rate of the fluid passing through the device 1, this adaptation being within the ability of the skilled person.

The fluid restriction element 5 may be fabricated by any convenient means, such as from several plates of material fixed together and shaped so as to define the connecting conduit 5a, 5b (as in the device of EP1364118), by photostructurisation of a monolithic piece of suitable photostructurisable glass, or similar.

The second port 9b and fourth port 11b are each in fluidic communication with a respective pressure sensor 17, 23 carried by a support 7a forming the basis of the pressure sensor assembly 7, sealing being provided as before by O-rings 13 or other suitable means as noted previously.

As illustrated, each sensor 17, 23 comprises a cavity 17a, 23a in fluidic communication with the respective ports 9b, 11b. Each cavity 17a, 23a is delimited on one side by a flexible outer wall 17b, 23b arranged so as to be able to flex in function of the pressure in the respective cavity 17a, 23a. This flexion is measured by a respective strain gauge 18, 25 (see FIG. 3) integrated within or upon the respective flexible outer wall 17b, 23b in a similar manner to EP1364118. However, any convenient type of pressure sensor can be used instead of the illustrated arrangement.

Electrical connections with the strain gauges 18, 25 are not illustrated, but can be integrated within or upon the support, interfacing with an electronic circuit and electrical connector 19 such as a ribbon connector. The strain gauges 18, 25 can be electrically connected in a Wheatstone bridge or other suitable configuration either by means of an electrical circuit integrated into the pressure sensor assembly 7, or situated remotely thereto.

The pressure sensor assembly 7 is held against the second surface 3b by means of a clipped-on cover 21 (see FIG. 1; omitted on FIGS. 2 and 3), which presses the support 7a against said surface 3b and thereby compresses the seals 13. As in the case of the fluid restriction element 5, the pressure sensor element 7 can be alternatively be retained by suitable clips, rivets, screws, glue, welding or similar, either acting directly on the pressure sensor element 7 or on a cover 21.

In use, the device 1 of the invention is integrated into the overall fluid pathway and functions in the same manner as that disclosed in EP1364118, a flow of fluid from the first conduit 9 to the second 11 (or vice-versa) generating a different pressure in each of the cavities 17*a*, 23*a* of the pressure sensors 17, 23. The pressures are sensed by the strain gauges 18, 25 and the signals are treated as is generally known in the field of flow sensors to calculate the flow rate of fluid.

Advantageously, the device 1 also comprises at least one temperature sensor 20, 26 (here illustrated as being adjacent to or integrated with the strain gauges 18, 25). This temperature sensor 20, 26 may be for instance a thermoresistor integrated into the flexible outer wall 17*b*, 23*b* of either or both of the pressure sensors 17, 23, or may be otherwise arranged on or in the support 7*a* or in or adjacent to the fluid pathway. For instance, such a temperature sensor could be situated in the fluid restriction element 5, or alternatively in or adjacent to one or both of the fluid conduits 9, 11. In general, the temperature sensor may be of any convenient type as known to the skilled person, arranged to measure the temperature of the fluid either directly or indirectly (i.e. in contact with the fluid or in close proximity thereto).

This temperature sensor can be used to increase the measurement accuracy in the case in which the viscosity of the fluid is not known a priori (such as might be the case in which the device 1 is used under constant temperature conditions), and if the viscosity can vary significantly enough due to temperature variations to render the measurements imprecise. Since the nature of the fluid passing through the device 1 is known, and the temperature-dependence of its viscosity is also known, the temperature measurement can be used when calculating flow rate, on the basis of the principles outlined in the papers "High Precision Piezo-Resistive Sensing Techniques for Micro-Dosing Applications" (M. Boillat et al. Proceedings Sensor Expo Cleveland 1999) and "A Differential Pressure Liquid Flow Sensor for Flow Regulation and Dosing Systems" (M. Boillat et al. 0-7803-2503-6 (c) 1995 IEEE). However, in the case in which the viscosity of the fluid is known a priori, or if its variation due to temperature does not negatively affect the flow rate measurement precision in practice, such a temperature sensor 20, 26 does not need to be present. It should be noted that the fluid passing through the sensor of the present invention can either be a liquid or a gas such as air, nitrogen or similar. In the case of liquid, this is typically the case in which a product is dosed from a reservoir, the flow always being in the same direction. In the case of a gas, this is either a similar case to liquid as mentioned previously, or may be the case when a liquid is dosed by being aspirated from a vessel and then expelled into another vessel, as in pipetting. In such an arrangement, the gas in question acts as a working fluid and is displaced by means of a bidirectional pump such as a membrane pump, syringe pump or similar. This pump is used to force air or another gas through the device 1 bidirectionally so as to aspirate and dispense liquid in such a manner that the liquid does not come in contact with the device 1.

Since in the illustrated embodiment the pressure sensor arrangement 7 and the fluid restriction element 5 are simply clipped onto the manifold element 3 by means of their respective covers 15, 21, they can be easily removed for cleaning or for exchange in the case in which optimisation of the fluid restriction element 5 and/or pressure sensor arrangement 7 is desired if the flow rate and/or viscosity of the fluid are changed.

Although the invention has been described with reference to specific embodiments, variations thereto are possible without departing from the scope of the invention as defined in the appended claims.

The invention claimed is:

1. A fluid flow rate measurement device, comprising:
   a manifold element, comprising a first fluid conduit extending from a first end surface thereof and terminating in a first port opening at a first lateral surface thereof and a second port opening at a second lateral surface thereof, said first end surface being distinct from said first lateral surface and said second lateral surface, said manifold element further comprising a second fluid conduit extending from a second end surface thereof and terminating in a third port opening at said first lateral surface and a fourth port opening at said second lateral surface;
   a fluid restriction element, fixed to said first lateral surface and arranged to provide a sealed fluid pathway between said first port and said third port; and
   a pressure sensor assembly, fixed to said second lateral surface and comprising a first pressure sensor in fluidic communication with said second port, and a second pressure sensor in fluidic communication with said fourth port.

2. The fluid flow rate measurement device according to claim 1, wherein said first lateral surface is situated on an opposite face of said manifold element with respect to said second lateral surface, said first and second lateral surfaces being substantially parallel with respect to each other.

3. The fluid flow rate measurement device according to claim 2, wherein said first port is substantially coaxial with respect to said second port, and said third port is substantially coaxial with respect to said fourth port.

4. The fluid flow rate measurement device according to claim 2, wherein said first fluid conduit is substantially coaxial with said second fluid conduit.

5. The fluid flow rate measurement device according to claim 2, further comprising sealing elements arranged to seal each of said first and third ports with respect to said fluid restriction element, and to seal each of said second and fourth ports with respect to said pressure sensor assembly.

6. The fluid flow rate measurement device according to claim 2, wherein at least one of said fluid restriction element and said pressure sensor assembly are attached to said manifold element by means of a respective cover.

7. The fluid flow rate measurement device according to claim 1, wherein said first port is substantially coaxial with respect to said second port, and said third port is substantially coaxial with respect to said fourth port.

8. The fluid flow rate measurement device according to claim 7, wherein said first fluid conduit is substantially coaxial with said second fluid conduit.

9. The fluid flow rate measurement device according to claim 7, further comprising sealing elements arranged to seal each of said first and third ports with respect to said fluid restriction element, and to seal each of said second and fourth ports with respect to said pressure sensor assembly.

10. The fluid flow rate measurement device according to claim 1, wherein said first fluid conduit is substantially coaxial with said second fluid conduit.

11. The fluid flow rate measurement device according to claim 10, further comprising sealing elements arranged to seal each of said first and third ports with respect to said fluid restriction element, and to seal each of said second and fourth ports with respect to said pressure sensor assembly.

12. The fluid flow rate measurement device according to claim 1, further comprising sealing elements arranged to seal each of said first and third ports with respect to said fluid restriction element, and to seal each of said second and fourth ports with respect to said pressure sensor assembly.

13. The fluid flow rate measurement device according to claim 1, wherein at least one of said fluid restriction element and said pressure sensor assembly are attached to said manifold element by means of a respective cover.

14. The fluid flow rate measurement device according to claim 13, wherein said cover is clipped on to said manifold element.

15. The fluid flow rate measurement device according to claim 1, wherein said pressure sensor assembly comprises a first cavity in fluidic communication with said second port and a second cavity in fluidic communication with said fourth port.

16. The fluid flow rate measurement device according to claim 15, wherein each of said cavities is delimited by a flexible wall provided with at least one strain gauge.

17. The fluid flow rate measurement device according to claim 1, further comprising a temperature sensor arranged to measure a temperature of said fluid.

18. The fluid flow rate measurement device according to claim 17, wherein said temperature sensor is attached to or integrated in said pressure sensor assembly.

19. The fluid flow rate measurement device according to claim 18, wherein said temperature sensor is attached to or integrated in a support comprised by said pressure sensor assembly.

20. The fluid flow rate measurement device according to claim 1, wherein each of said cavities is delimited by a flexible wall provided with at least one strain gauge, wherein said fluid flow rate measurement device further comprises a temperature sensor arranged to measure a temperature of said fluid, and wherein said temperature sensor is integrated into said flexible wall of at least one of said cavities.

* * * * *